(12) United States Patent
Watson

(10) Patent No.: US 10,260,631 B2
(45) Date of Patent: Apr. 16, 2019

(54) LEAK RESISTANT PUMP

(71) Applicant: Billy Dean Watson, Whitney, TX (US)

(72) Inventor: Billy Dean Watson, Whitney, TX (US)

( * ) Notice: Subject to any disclaimer, the term of this patent is extended or adjusted under 35 U.S.C. 154(b) by 0 days.

(21) Appl. No.: 16/105,340

(22) Filed: Aug. 20, 2018

(65) Prior Publication Data
US 2018/0355973 A1 Dec. 13, 2018

Related U.S. Application Data

(63) Continuation-in-part of application No. 14/952,259, filed on Nov. 25, 2015, now Pat. No. 10,054,226.

(51) Int. Cl.
| F04D 29/08 | (2006.01) |
| F04D 29/12 | (2006.01) |
| F04D 29/10 | (2006.01) |
| F16J 15/00 | (2006.01) |
| F16J 15/40 | (2006.01) |
| F16J 15/447 | (2006.01) |

(52) U.S. Cl.
CPC ............ *F16J 15/004* (2013.01); *F04D 29/08* (2013.01); *F04D 29/10* (2013.01); *F16J 15/40* (2013.01); *F16J 15/4472* (2013.01); *F16J 15/4474* (2013.01); *F04D 29/12* (2013.01)

(58) Field of Classification Search
CPC .......... F16J 15/002; F16J 15/004; F16J 15/40; F16J 15/406; F16J 15/447; F16J 15/4472; F04D 29/08; F04D 29/10; F04D 29/12
See application file for complete search history.

(56) References Cited

U.S. PATENT DOCUMENTS

| 10,054,226 B1 * | 8/2018 | Watson | F16J 15/002 |
| 2009/0196743 A1 * | 8/2009 | Ueno | F01D 11/003 |
| | | | 415/174.5 |
| 2015/0104291 A1 * | 4/2015 | Kosmicki | F01D 25/16 |
| | | | 415/1 |

* cited by examiner

*Primary Examiner* — Nicholas L Foster
(74) *Attorney, Agent, or Firm* — Buskop Law Group, P.C.; Wendy Buskop

(57) ABSTRACT

An improved leak resistant pump with sealing system for preventing leakage of a fluid from a housing. The sealing system has a housing, wherein the housing contains the fluid. A shaft penetrates the housing. A narrow fluid flow path directs a leaked fluid from the housing. A labyrinth seal constrains the leaked fluid from the narrow fluid flow path. A stationary seal constrains a flow of the leaked fluid from the labyrinth seal and a grease seal for constraining the flow of the leaked fluid from the stationary seal.

17 Claims, 2 Drawing Sheets

LEAK RESISTANT PUMP

The present application is a Continuation in Part of co-pending application U.S. patent application Ser. No. 14/952,259 filed on Nov. 25, 2015, entitled "MECHANICAL SEALING SYSTEM". This reference are herein incorporated in their entirety.

FIELD

The present embodiments generally relate to an improved leak resistant pump system.

BACKGROUND

Pumps require mechanical sealing in the region where a shaft driven by a motor enters a housing. Pumps can often contain fluid within the housing. It is desirable to seal the shaft entry of the pump to prevent any fluid in the housing from entering the atmosphere or affecting shaft bearings.

A typical mechanical seal will utilize a sealing face that is rotating against another sealing face. The sealing faces are held together by mechanical means, such as springs, hydraulic pressure, or a combination thereof.

An inherent part of a mechanical seal is the paradoxical notion that it must leak in order to work. Almost all mechanical seals utilized for pumps utilize the process fluid as lubrication for the seal faces. As such, some process fluid flows through the mechanical seal and exit the housing.

While this is typically a small amount of fluid, the problem is significant when pumping caustic, corrosive, or otherwise dangerous fluids.

In addition to process fluid being used to lubricate the seal faces, mechanical seals are often very sensitive to process upsets or deflections of the shaft. System conditions such as pump or compressor cavitation can cause the shaft to deflect along its rotational axis. This can in turn cause the seal surfaces to separate and allow significant leakage.

In instances where hard but brittle materials such as Silicon Carbide are utilized for seal faces, impact of the seal faces against one another during upset conditions can cause cracking or shattering of the seal faces.

Upset conditions can also cause radial deflections of the shaft, leading to sealing surface misalignment, uneven loading, and potential failure of the seal.

Often, double mechanical seal arrangements are utilized for critical equipment. Costly, bulky, and heavy bearing frame assemblies are often utilized to help minimize shaft deflections that mechanical seals are sensitive to.

When a mechanical seal fails, the fluid within the housing can leak to the atmosphere or into the bearing frame assembly. This can cause significant injury to personnel, violate environmental regulations, violate occupational safety regulations, and damage surrounding equipment.

A need exists for a cost efficient leak resistant pump with mechanical sealing system for preventing the leakage of a fluid to the atmosphere.

A further need exists for an improved leak resistant pump wherein upon a failure, leakage can be directed through a drain to a safe containment area, activate a shut-down of the equipment, or an alarm.

The present embodiments meet these needs.

BRIEF DESCRIPTION OF THE DRAWINGS

The detailed description will be better understood in conjunction with the accompanying drawings as follows.

Figure 1:
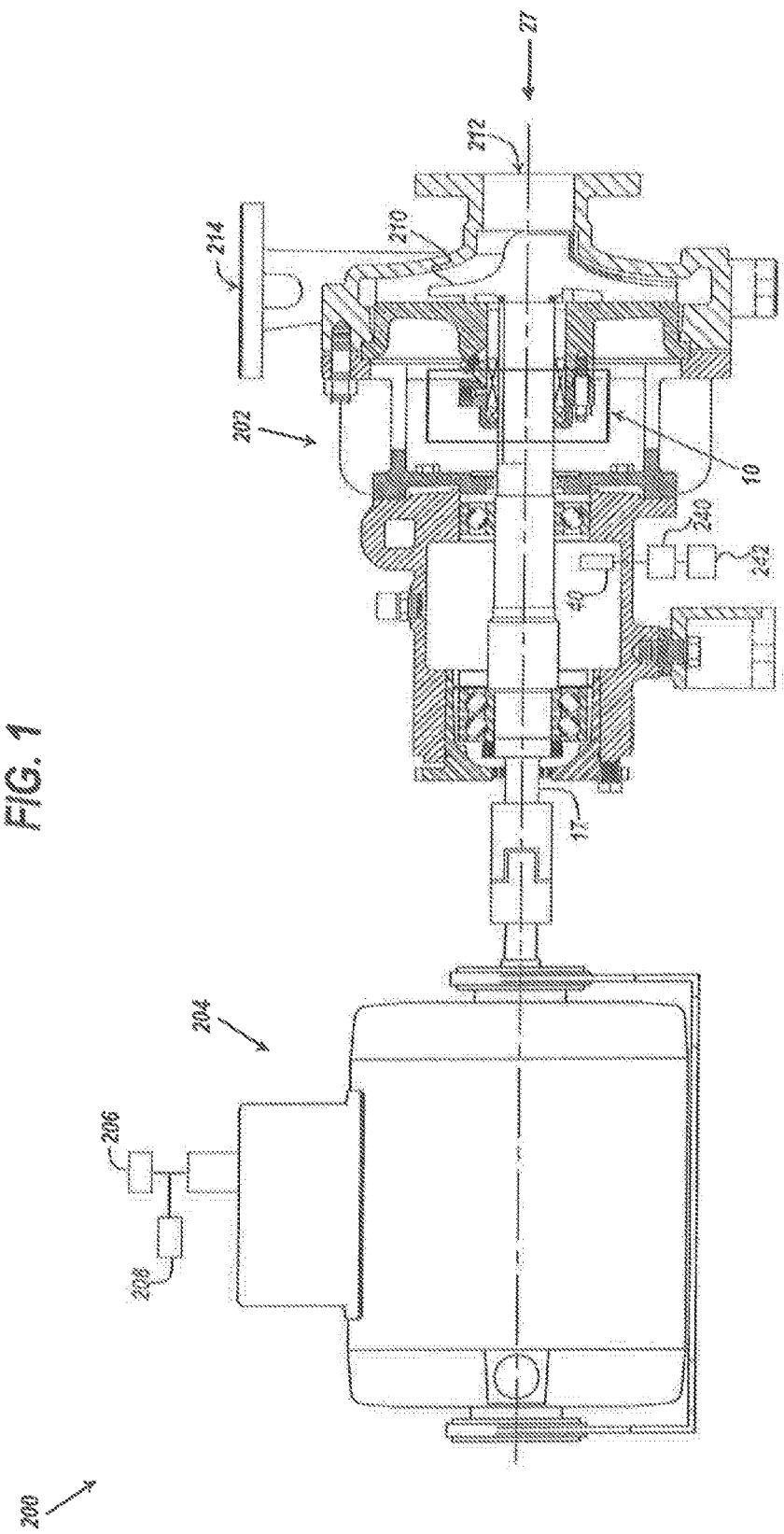
FIG. 1 is a diagram of an embodiment of the leak resistant pump according to one or more embodiments.

The present embodiments are detailed below with reference to the listed Figures.

DETAILED DESCRIPTION OF THE EMBODIMENTS

Before explaining the present pump in detail, it is to be understood that the pump is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present embodiments generally relate to an improved pump with a sealing system for preventing the leakage of a fluid by constraining a flow of leaked fluid through the usage of a narrow fluid flow path and various seals.

The present embodiments generally relate to a leak resistant pump with sealing system that can prevent leakage, contain pressure, or exclude contamination. The pump with mechanical sealing system can prevent leakage of a fluid from a pump assembly by using a narrow fluid flow path and various seals. The various seals can include a labyrinth seal, a stationary seal, and a grease seal. The labyrinth seal can be proximate the stationary seal. The stationary seal can be proximate the grease seal.

The present invention is cost efficient by providing all of the safety and environmental protection of multiple redundant seals at the cost of single mechanical seals for a pump.

The present invention provides a pump that requires a minimal amount of grease to maintain barrier grease, which can be automated for virtually maintenance free operation.

The term "shaft" as used herein can refer to a rotating element entering a housing.

The term "fluid" as used herein can refer to any process liquid or gas that it is desirable to seal within a pump assembly.

The pump can use a sealing system that can be mounted directly onto a shaft, or in embodiments can use a shaft sleeve to be mounted. Utilizing a shaft sleeve facilitates the manufacture of the sealing system in a cartridge form for easy installation in the pump.

The pump with sealing system can have a narrow fluid flow path proximate the pump assembly to constrain the flow of process fluid from the pump assembly. This narrow fluid flow path can have a close tolerance to the shaft or the shaft sleeve, if used. The close tolerance can be adjusted based upon viscosity, specific gravity, density, and other pertinent characteristics of the process fluid. Persons having ordinary skill in the art can easily determine the appropriate tolerance to use to constrain the flow of a specific liquid.

A secondary stationary seal, such as an O-ring or other equivalent to a toric joint can be used to close off the narrow fluid flow path at a desired location. Various seals such as X-rims, D-rings, Q-rings, gaskets, and the like are well known to, and selectable by persons having ordinary skill in the art for this purpose.

The pump with sealing system can have a labyrinth seal for constraining any fluid that is leaked from the narrow fluid flow path. The labyrinth seal can be distal to the housing from the narrow fluid flow path.

Labyrinth seals typically have very low friction wear and, therefore, long lives. Often high speed applications prefer the use of such a seal. Further, fluid takes a significantly long time to travel through the tortuous path within a labyrinth seal. The tolerance between the labyrinth seal and the shaft or shaft sleeve, if used, can be adjusted by persons having ordinary skill in the art in the same manner as discussed above.

The pump with sealing system can have a stationary seal for constraining any fluid that is leaked from the labyrinth seal. Any equivalent to a tonic joint or gasket can be utilized for this purpose. The stationary seal can be distal to the housing from the labyrinth seal.

The pump with sealing system can have a grease seal for constraining any fluid that is leaked from the stationary seal. The grease seal can be distal to the housing from the stationary seal.

While referred to as a "grease seal", due to common usage, any barrier fluid as desirable to impede the specific process fluid can be utilized, and need not be limited to grease. For many applications, grease can suffice as the barrier fluid but any reasonable barrier fluid can be selected by persons having ordinary skill in the art.

The sealing system of the pump can have a grease inlet port for injecting grease or other barrier fluid into the grease seal. The inlet port can be fed by manually, or by means of an automated system. Levels and pressures of barrier fluid can be adjusted by persons having ordinary skill in the art based upon the specific application.

In embodiments, the sealing system of the pump can have a secondary grease seal in a secondary inlet port.

The sealing system of the pump can have a drain distal to the housing from the grease seal. In embodiments, the drain can be situated in between a first and a secondary grease seal.

The drain can direct any leaked fluid to a containment area, empty to a flare, or be proximate a sensor for detecting fluid. The sensor can communicate with a control system, or activate an alarm when a fluid is present.

In this manner, a highly effective and reliable sealing system with redundant sealing systems can be cost effectively manufactured to replace current usage of double mechanical seals.

The present invention is less sensitive to system upsets or shaft deflections, and has significantly fewer failure modes than currently used devices.

Turning now to the Figures, FIG. 1 depicts an improved leak resistant pump 200.

FIG. 1 shows a motor 204 connected to a power supply 206 or a fuel supply 208.

FIG. 1 shows a pump assembly 202 connected to the motor 204.

The pump assembly has an impeller 210 containing a suction inlet 212 and discharge outlet 214.

A shaft 17 is connected between the motor 204 and the impeller 210;

A sealing system 10 is installed in the pump assembly.

A leaked fluid 27 can enter through the suction inlet 212.

Figure 2:
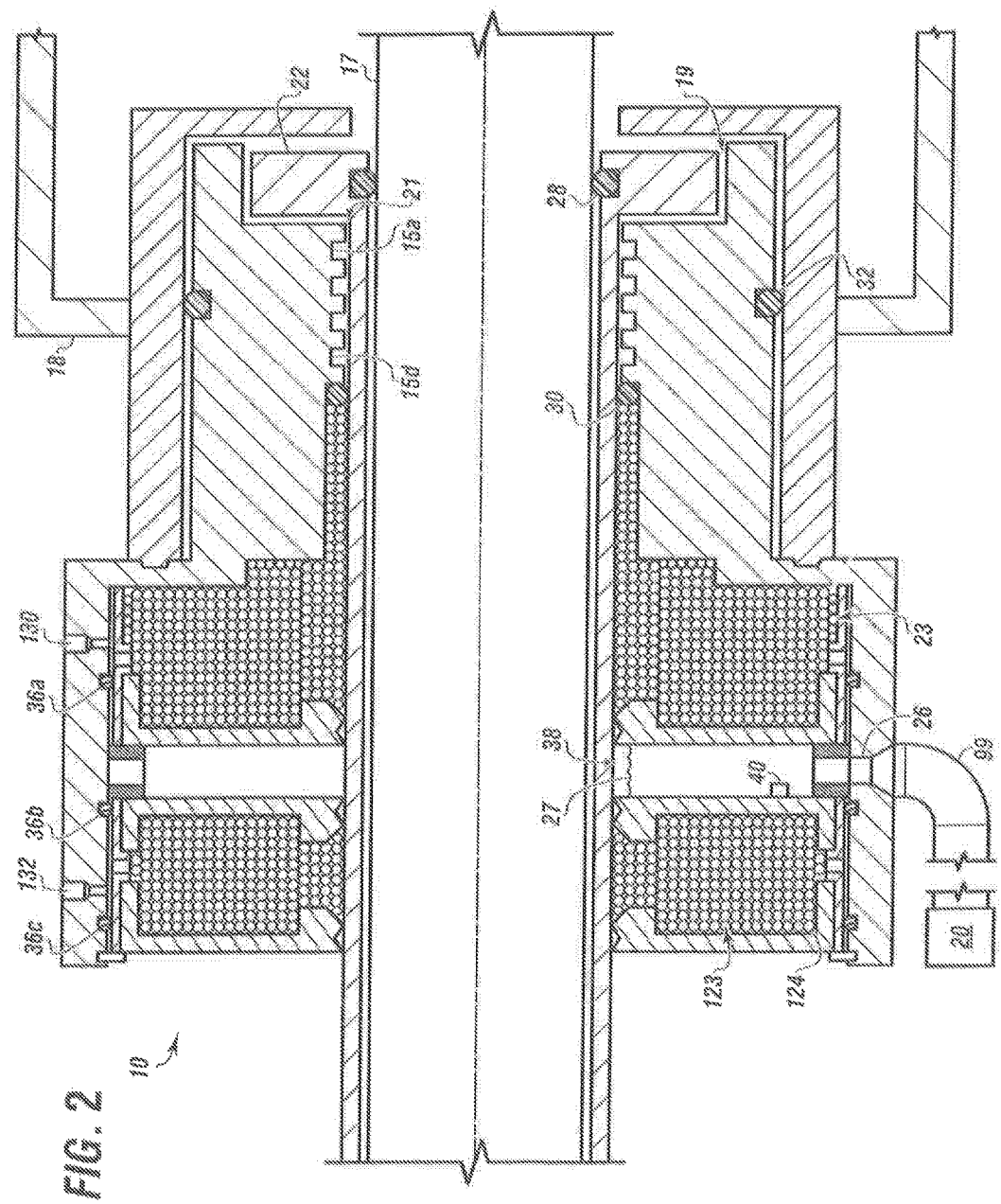
FIG. 2 depicts a cross sectional view of a sealing system for the pump according to one or more embodiments.

FIG. 2 depicts a sealing system of the pump assembly according to one or more embodiments.

The sealing system 10 surrounds the shaft 17.

The shaft can rotate.

A shaft sleeve 22 can be attached to the shaft by a shaft sleeve attachment 28. The shaft sleeve can be a cylindrical, hollow tube. The shaft sleeve attachment can be O-rings, D-rings, snap rings, or any other means used by persons having ordinary skill in the art.

A narrow fluid flow path 19 can direct a leaked fluid 27 from the housing 18 towards a labyrinth seal 21 or the secondary stationary seal 32. The narrow fluid flow path 19 can be close tolerance, which can ensure minimum leakage.

In embodiments, a first stationary seal 30 can constrain a flow of the leaked fluid from the labyrinth seal. The first stationary seal 30 can be O-rings, wedges, V-rings, rubber boots, U-cups, or chevrons.

The labyrinth seal 21 can constrain the leaked fluid 27 from the narrow fluid flow path 19. The labyrinth seal can also be non-contacting, which means the labyrinth seals do not come into contact with the shaft 17 or the shaft sleeve 22, if used. The labyrinth seal can be made from steel, aluminum, thermoplastic, or any material as required by a specific application.

The labyrinth seal 21 can have a plurality of grooves 15a-15d. The plurality of grooves can press tightly inside an axle, or inside a hole, so that the leaked fluid has to pass through a long and tortuous path to escape. In embodiments, the labyrinth seal can control the passage of the leaked fluid through the plurality of grooves by centrifugal motion. The centrifugal motion can help prevent containment ingress and lubricant loss.

The secondary stationary seal 32 can constrain the leaked fluid 27 from the narrow fluid flow path 19. The secondary stationary seal can be O-rings, wedges, V-rings, rubber boots, U-cups, or chevrons.

A grease seal can constrain a flow of the leaked fluid from the first stationary seal 30.

The sealing system 10 can include a grease inlet port 130 for injecting grease 23 into the grease seal. The grease can be grease, oil, or any applicable barrier fluid. The grease injected inside the grease seal can provide lubrication for the shaft.

The sealing system 10 can include a secondary grease seal 124. A secondary grease inlet port 132 can inject a secondary grease 123 into the secondary grease seal 124. The secondary grease can be grease, oil, or any applicable barrier fluid. The secondary grease seal can provide lubrication for the shaft.

In embodiments, the sealing system 10 can include a plurality of grease stationary seals 36a, 36b and 36c. The plurality of grease stationary seals can constrain the flow of leaked grease from the grease inlet port 130 or the secondary grease inlet port 132.

A gap 38 between the grease seal and the secondary grease seal can drain the leaked fluid 27 to a drain 26. In embodiments, a sensor 40 to detect fluid can be proximate the drain.

The leaked fluid contained in the drain can be routed via a conduit 99 to a flare or a containment vessel 20.

The sensor 40 can be an optical sensor a level switch, a pressure sensor, or any other means as known to persons having ordinary skill in the art for the detection of fluid.

In an embodiment, the improved leak resistant pump has a primary grease inlet port is used for injecting the grease into the grease seal and the grease in the grease seal is for lubrication of the shaft.

In an embodiment, the improved leak resistant pump has a secondary grease seal along with the primary grease seal.

In an embodiment, the improved leak resistant pump the drain can be connected to a flare or a containment vessel for draining the fluid into the flare or containment vessel.

In an embodiment, the improved leak resistant pump can use a pressure sensor or a flow meter as the sensor proximate the drain to detect the fluid when the fluid is leaking from the pump housing. The sensor can in electronic communication with a control system that can be a processor, or a cloud processing device to activate an alarm.

In an embodiment, the improved leak resistant pump uses a sensor that wirelessly or in a wired configuration activates an alarm that communicates via a network to a user or a plurality of users simultaneously, that the pump is leaking providing pressure information or flow information.

In an embodiment, the improved leak resistant pump, the narrow fluid flow path has a close tolerance with the shaft sleeve.

In an embodiment of the improved leak resistant pump, the stationary seal comprises an O-ring, a wedge, a V-ring, a rubber boot, a U-cup, or a chevron.

In an embodiment, the improved leak resistant pump, the labyrinth seal is proximate the stationary seal, and the stationary seal is proximate the grease seal, such as from 10 microns to 3 centimeters distant.

In an embodiment, the improved leak resistant pump uses a labyrinth seal with a plurality of grooves such as from 2 to 10 grooves.

In an embodiment, the improved leak resistant pump uses a labyrinth seal to control the passage of the fluid and the labyrinth seal can be made of steel, aluminum, or thermoplastic.

In an embodiment, the improved leak resistant pump has a labyrinth seal that is non-contacting.

In an embodiment, the improved leak resistant pump, the shaft sleeve attachment is a collar.

In still another embodiment, a secondary stationary seal can be used to constrain the flow of the leaked fluid from the narrow fluid flow path.

While these embodiments have been described with emphasis on the embodiments, it should be understood that within the scope of the appended claims, the embodiments might be practiced other than as specifically described herein.

What is claimed is:

1. An improved leak resistant pump comprising:
   (i) a motor;
   (ii) a pump assembly connected to the motor, the pump assembly having an impeller containing a suction inlet and discharge outlet;
   (iii) a shaft connected between the motor and the impeller;
   (iv) a sealing system for preventing leakage of a fluid from the improved leak resistant pump, the sealing system comprising:
      1. a shaft sleeve surrounding the shaft;
      2. a shaft sleeve attachment securing the shaft sleeve to the shaft enabling the shaft sleeve to spin with the shaft;
      3. a labyrinth seal receiving the fluid from a narrow fluid flow path in the pump assembly and for constraining the fluid from the narrow fluid flow path without stopping fluid flow;
      4. a first stationary seal in the pump assembly distal from the labyrinth seal, the first stationary seal having a thermoplastic sealing element using a grease as a buffer between the fluid and atmosphere, and wherein (a) the first stationary seal prevents grease from leaking from the pump assembly as loss of suction on the fluid reduces pressure on the fluid; and (b) the first stationary seal prevents grease from leaking from the pump assembly when the pump is not operating;
      5. a grease seal having a cavity filled with grease in the pump assembly distal from the stationary seal to direct leakage away from the grease seal, the grease acting as a buffer to the fluid;
      6. a secondary stationary seal preventing leakage to atmosphere and to the motor; and
      7. a gap axially positioned between the grease seal and the secondary stationary seal having a drain for draining leaked fluid from the grease seal.

2. The improved leak resistant pump of claim 1, comprising a primary grease inlet port for injecting the grease into the grease seal.

3. The improved leak resistant pump of claim 2, wherein the grease in the grease seal is for lubrication for the shaft.

4. The improved leak resistant pump of claim 1, comprising a secondary grease seal.

5. The improved leak resistant pump of claim 1, wherein the drain is connected to a flare or a containment vessel for draining the fluid into the flare or containment vessel.

6. The improved leak resistant pump of claim 1, further comprising a sensor proximate the drain to detect the fluid when the fluid is leaking from the housing.

7. The improved leak resistant pump of claim 6, wherein the sensor is in electronic communication with a control system to activate an alarm.

8. The improved leak resistant pump of claim 7, wherein the sensor activates an alarm.

9. The improved leak resistant pump of claim 1, wherein the shaft rotates.

10. The improved leak resistant pump of claim 1, wherein the narrow fluid flow path has a close tolerance with the shaft sleeve.

11. The improved leak resistant pump of claim 1, wherein the stationary seal comprises an O-ring, a wedge, a V-ring, a rubber boot, a U-cup, or a chevron.

12. The improved leak resistant pump of claim 1, wherein the labyrinth seal is proximate the stationary seal, and further wherein the stationary seal is proximate the grease seal.

13. The improved leak resistant pump of claim 1, wherein the labyrinth seal has a plurality of grooves.

14. The improved leak resistant pump of claim 1, wherein the labyrinth seal controls the passage of the fluid.

15. The improved leak resistant pump of claim 1, wherein the labyrinth seal comprises at least one of: steel, aluminum, or thermoplastic.

16. The improved leak resistant pump of claim 1, wherein the labyrinth seal is non-contacting.

17. The improved leak resistant pump of claim 1, wherein the shaft sleeve attachment is a collar.

* * * * *